Figure 3:
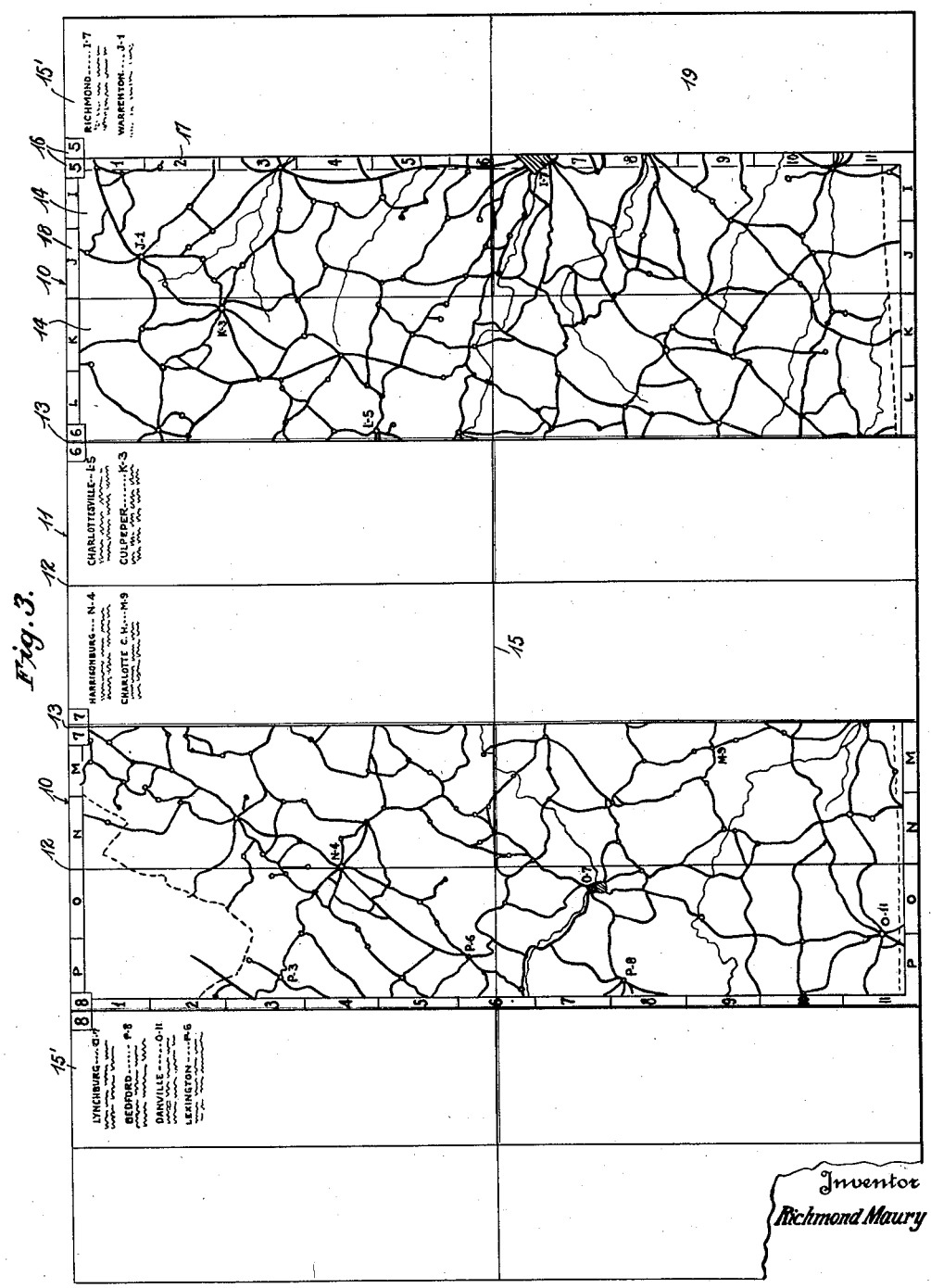

April 12, 1932.    R. MAURY    1,853,829
CHART
Filed June 23, 1931    3 Sheets-Sheet 1
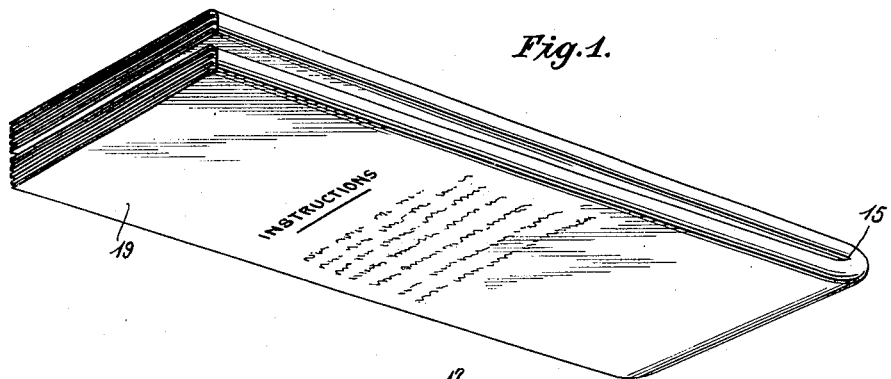
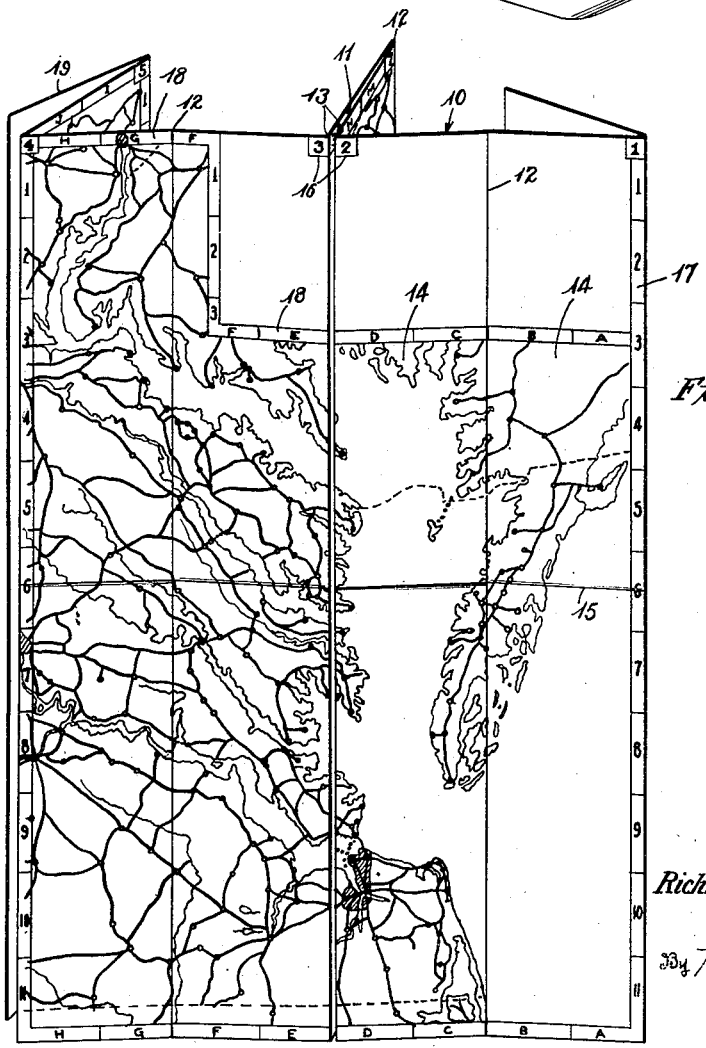
Inventor
Richmond Maury
By Knight Bros.
Attorneys April 12, 1932.   R. MAURY   1,853,829
CHART
Filed June 23, 1931   3 Sheets-Sheet 2

Inventor
*Richmond Maury*

By *Knight Bros.*
Attorneys

April 12, 1932.　　　　R. MAURY　　　　1,853,829
CHART
Filed June 23, 1931　　　3 Sheets-Sheet 3
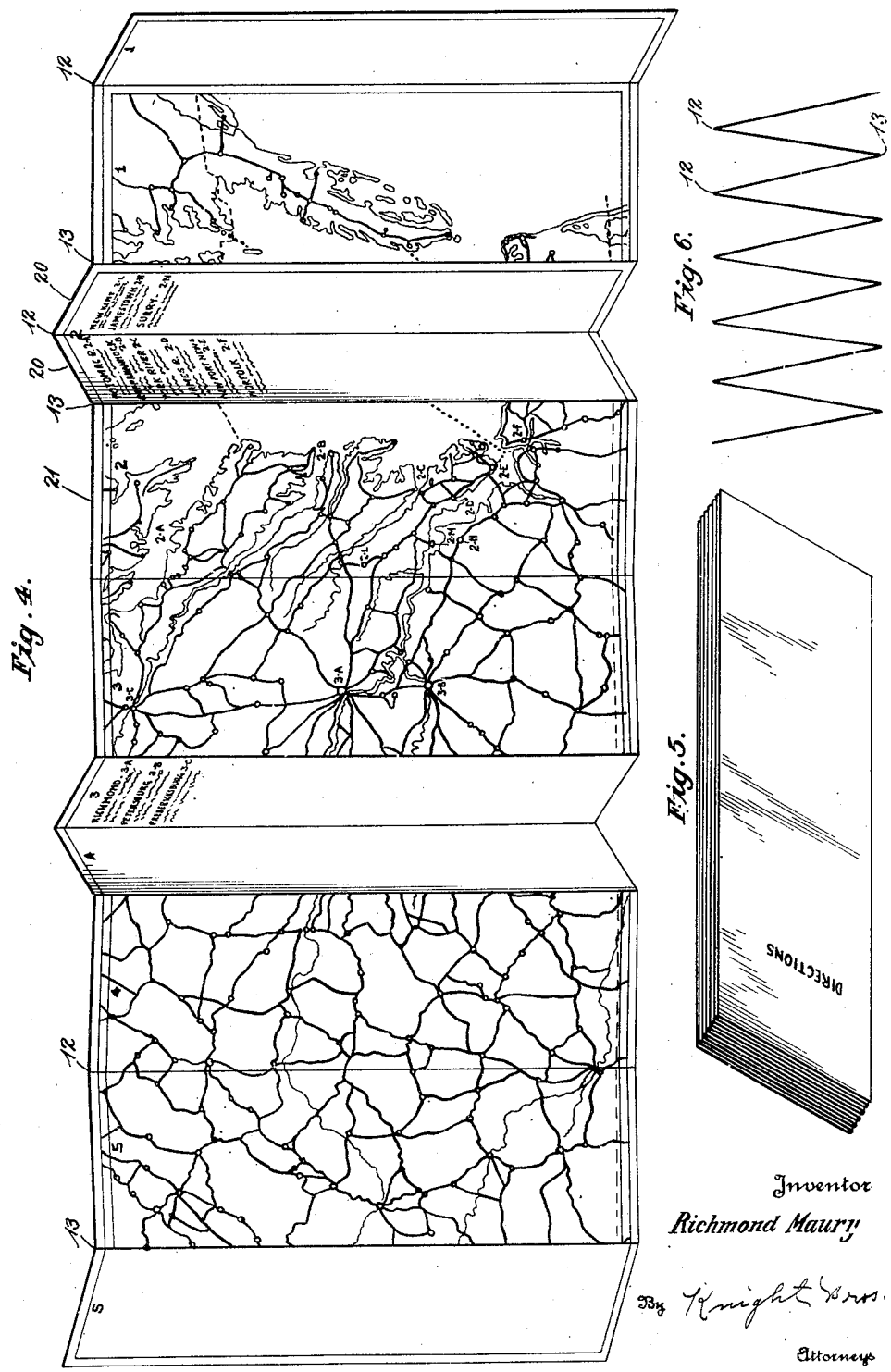

Patented Apr. 12, 1932

1,853,829

UNITED STATES PATENT OFFICE

RICHMOND MAURY, OF RICHMOND, VIRGINIA

CHART

Application filed June 23, 1931. Serial No. 546,316.

This invention has to do with a new kind of chart designed with the convenience of motorists in view. The general object of the invention is to provide a chart embracing a relatively large section of country divided into parallel strips of map and descriptive matter, the chart being folded so that individual map strips and appurtenant descriptive strips can be exposed to view.

Another object is to provide a chart of this kind so arranged and folded that map strips, although separated by descriptive strips, can be brought together to exhibit a continuous map of a large section of country.

Another object is to provide a map of the character above described which can be held between the thumb and fingers and thumbed over from strip to strip to bring the desired part of the map to view.

The descriptive matter may consist of route directions, or historical information about the various points or towns along the road, or of any other kind of information which might be used in connection with a map.

In the drawings, in which I have shown two illustrative embodiments of the invention, Fig. 1 is a perspective view of a chart folded up, Fig. 2 is a perspective view of a chart partly opened out, Fig. 3 is a face view of the chart entirely spread out, this view showing the side of the chart opposite to that shown in Fig. 2, Fig. 4 is a perspective view of a slightly modified form of chart partly spread out, Fig. 5 is a perspective view of the chart shown in Fig. 4 in folded position, and Fig. 6 is an end view of the same chart slightly expanded.

Referring first to the form of the invention shown in Figs. 1 to 3, the chart is made up of sections of map 10 and sections 11 bearing descriptive matter. The chart is folded along vertical folds 12 at the middle of each section and 13 at the edges of each section in zigzag form, so that it can be folded up to a width corresponding to the strips 14. The map may then be doubled over transversely as shown in Fig. 1 to further reduce its size. This last fold 15 does not interfere with the manipulation of the map when it is being spread out as the vertical folds counteract the tendency of the map to fold along the line 15.

Beside each strip of map 14 is a strip 15' bearing descriptive matter relating to the appurtenant strip of map. The descriptive matter may be composed of items of historical interest about various towns or other points of interest in the adjacent section of map. The descriptive strips and map strips are identified by numbers 16 and the descriptive items refer to the points on the map by the ordinary map reference system of horizontal and vertical zones bearing reference numerals 17 and reference letters 18. There may be an extra strip 19 which folds around the others when the map is folded up and which may bear on its face instructions for manipulating the map.

In opening up the map to a particular strip the fold 15 is first straightened out and the instruction flap 19 is folded around to the back. The chart is now held between the thumb and fingers and the strips are thumbed over until the desired one is exposed, whereupon the other strips are clasped in closed position by the thumbs and the map strip and its descriptive strip are spread out to view. If the observer wishes to scan a larger section of country at once, map sections showing two adjacent sections of country can be spread out without spreading the descriptive sections, so that the edges of the map sections are brought together and give the appearance of a continuous map, as shown in Fig. 2. This result is achieved by folding the map sections and descriptive sections in the middle as well as at the edges, as will be understood from an examination of Fig. 2.

The map may be continued around to the rear side of the chart as shown in Fig. 3, and the manipulation for the sections on the rear face is the same as for the front face.

In the form of the invention shown in Figs. 4 to 6 the height of the chart is reduced sufficiently so that the transverse fold is unnecessary. Another modification shown in Fig. 4 is that the descriptive strips are not necessarily arranged one for each map strip, but there may be two or more descriptive strips 20 for one map strip 21. This is desirable where the section of country covered by a certain strip of map is so rich in historical interest that a single descriptive strip is insufficient to cover it. Aside from these differences the chart shown in Figs. 4 to 6 is the same as the one shown in Figs. 1 to 3.

Having described my invention, I claim:

1. A chart comprising elongated strips bearing maps of adjacent sections of country and elongated strips bearing descriptive matter, the map sections and descriptive matter being alternately arranged, the chart being folded longitudinally in such a way that the map strips for adjacent sections of country can be brought into juxtaposition.

2. A chart folded in zig-zag form so that it is composed of a series of pairs of strips facing each other when the chart is folded, the pairs of strips being alternately covered with sections of map representing adjacent sections of country and with descriptive matter, whereby the map sections can be spread out and the descriptive sections folded to bring adjacent sections of map together.

3. A chart comprising a map and descriptive matter, the map being divided into sections separated from each other by sections bearing the descriptive matter, the chart being folded in zig-zag form at the middle and edges of each section.

The foregoing specification signed at Richmond, Virginia, this 22nd day of June, 1931.

RICHMOND MAURY.